Figure 1:
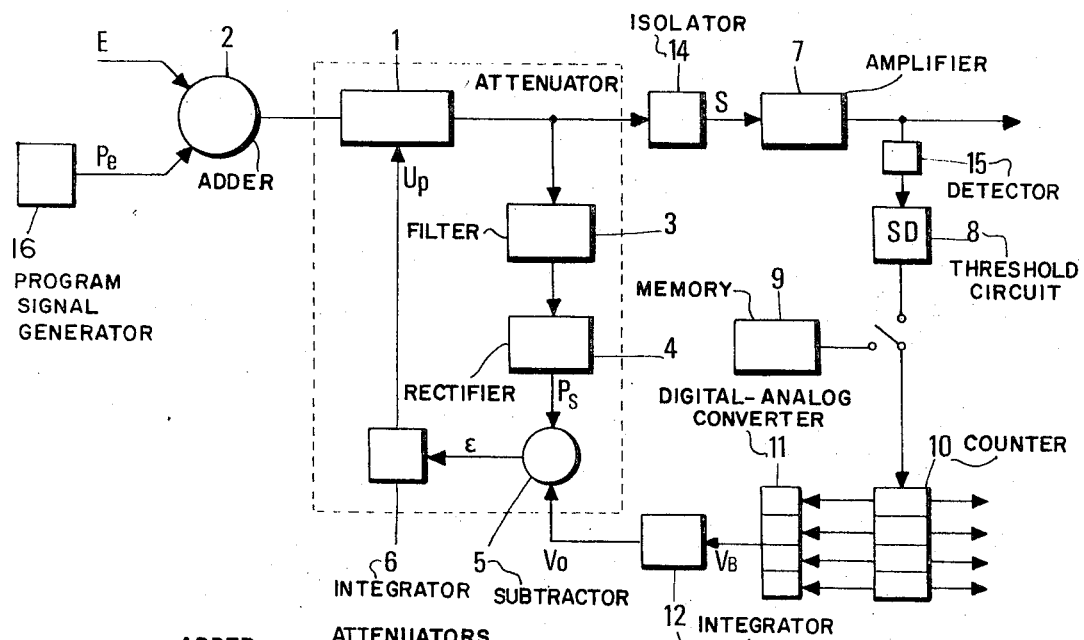

United States Patent [19]
Barret

[11] 3,818,364

[45] June 18, 1974

[54] DEVICE FOR VARYING THE SPEED OF EVOLUTION OF AN AMPLIFIER GAIN

[75] Inventor: Jean-Pierre Barret, Chambourcy, France

[73] Assignee: Institut Francais Du Petrole des Carburants et Lubrifiants, Rueil-Malmaison, France

[22] Filed: Aug. 24, 1972

[21] Appl. No.: 283,293

[30] Foreign Application Priority Data
Sept. 1, 1971  France .............................. 71.31691

[52] U.S. Cl..................... 330/52, 330/132, 330/144
[51] Int. Cl............................................. H02g 3/22
[58] Field of Search ....... 330/29, 52, 132, 137, 144, 330/645

[56] References Cited
UNITED STATES PATENTS
3,337,749   8/1967   Lee et al............................ 330/145
FOREIGN PATENTS OR APPLICATIONS
554,426   7/1943   Great Britain....................... 330/52

Primary Examiner—Herman Karl Saalbach
Assistant Examiner—James B. Mullins
Attorney, Agent, or Firm—Craig & Antonelli

[57]  ABSTRACT

An amplifier of variable gain for amplifying signals whose amplitude vary during time, comprising an element for adding these signals to a program-signal, the amplitude of which is independent from the amplitude variations of said signals, means for attenuating the signal resulting from said addition of signals, with an attenuation factor depending on a control voltage, and means for generating said control voltage comprising means for isolating from the signal produced by said attenuating means the component thereof which corresponds to the program-signal, a substracting element for substracting from said component a reference signal produced by means for generating a voltage represented, as a function of time, by a curve formed of a continuous succession of straight line sections having slopes of predetermined values, and means for integrating the signal issued from the substracting element which produce said control voltage.

13 Claims, 4 Drawing Figures

DEVICE FOR VARYING THE SPEED OF EVOLUTION OF AN AMPLIFIER GAIN

This invention concerns a variable gain amplifier whose gain expansion or compression rate is digitally controlled, either automatically by the output signal energy or according to a program of instructions.

This amplifier, interposed between a signal sensor and a recorder, provides for a reduction of the expansion scale of the received electromagnetic or acoustic signals.

It may be used, for example is seismic prospecting for reducing the variation range, which may cover 140 dB, of the acoustic signals sensed by geophones before their recording in a device whose variation range is about 20 dB. It may also be used in oceanography in an amplifier chain for the echos of sonic waves transmitted from a sonar.

The known analogical devices for controlling an amplifier gain include an element for attenuating the received signals. This element is controlled by a voltage derived from the signals issuing from the attenuator or by a voltage produced by a programmed signal generator.

In the first case the voltage of the signals issued from the attenuator, after detection and filtering, is compared to a reference steady voltage and the signal corresponding to the difference of the voltages controls the attenuator, after an amplification. The variation of the attenuation factor permits to maintain at a substantially constant level equal to that of the reference voltage, the signals issued from the attenuator, when the input signals vary. In the case where the transmitted and received signals are pulses, the automatic gain control systems suffer from the drawback of amplifying the noise during the time interval between the reception of the successive echos, which makes difficult their detection.

When the gain is programmed in open loop, the attenuation depends on the program voltage and not on the signal issued from the attenuator. The devices operating according to this principle are not very safe since they do not permit to detect a possible alteration of the characteristics of the gain control amplifier usually interposed between the programmed signal generator and the attenuator. More frequently a closed loop is used for programming the gain.

In such an arrangement the attenuator is fed with a signal obtained by adding a program voltage to the voltage of the signals issued from the sensors. After passage through the attenuator and optionally through a steady gain amplifier, the programmed voltage is isolated by filtration and substracted from a reference voltage. The resulting signal controls the attenuation so that the value of the program voltage before filtration be constant. The advantage of the closed loop programmed gain systems is in the fact that the value of the signals issued from the steady gain amplifier are corresponding to the signals produced by the sensors is only dependent on the latter and on the program voltage. It is substantially independent from the attenuator characteristics which vary by the effect of the temperature conditions or according to the manufacturing tolerances. This type of a closed loop device suffers, however, from a main drawback: In order to maintain at a constant level the signals issued from the chain comprising the attenuator and the amplifier, which correspond to the signals produced by the sensors, it is necessary that the modulated envelope of the program voltage be compelled to follow the variations of the input signal envelope. This modulated envelope is accordingly difficult to generate with the desired accuracy (e.g of about $10^{-3}$). The attenuation and the amplification factors being not known with accuracy, it is not possible to determine with accuracy the value of the signals to be measured, issued from the sensors.

In order to avoid such inconvenience of the gain analogical control, there is used gain digital control systems. The gain variations are controlled in the form of an automatic or programmed binary commutation through a device comprising a set of resistances whose values are known with accuracy and a commutator system. The attenuation generally varies by successive powers of number two.

The advantage of these digitally controlled systems is essentially in their high accuracy. This advantage is reduced by the fact that frequent gain surges result in a substantial alteration of the shape of the output signals produced by the sensors.

It is an object of the invention to provide a variable gain amplifier for amplifying signals whose amplitude vary during time, which avoids the above-mentioned drawbacks, particularly the discontinuous gain variations produced by the binary gain commutation systems.

This device is remarkable in that it includes means for adding signals to a program signal whose amplitude is independent from the amplitude variations of these signals and means for attenuating the signal resulting from said addition of signals, the attenuation factor of said means depending on a control voltage. It further comprises means for generating a control voltage, consisting of means for isolating from the signal produced by the attenuating means, the signal component corresponding to the program-signal, a substracting element for substracting from said component a reference signal produced by means for generating a voltage whose representative curve versus time is formed of a continuous succession of straight line sections having slopes of predetermined valves, and means for integrating the signal issued from the substracting element, producing the control voltage.

The advantages of such a structure are derived from the fact that:

a. it is unnecessary to generate a program-signal whose amplitude must follow the amplitude variations of the envelope of the received signals. The program-signal may consist either of a constant direct voltage or of an alternating voltage of steady amplitude;

b. since the reference signal consists of a continuous succession of straight line sections, no abrupt discontinuity in the shape of the output signals as compared to the shape of the signals issuing from the sensors is to be observed.

The device is also remarkable in that the means for generating a direct voltage comprise a counter for memorizing binary digital values, means for converting these digital values to analogical values and for integrating the same versus time. The counter register originally displays an initial value. The counter receives at determined moments one or more binary digital values representing the values of the slopes of the various portions of the reference voltage proportional to time. In a first embodiment of "programmed gain control,"

these digital values supplied to the counter are issuing from a memory containing a series of predetermined values.

In a second operating embodiment with "automatic control" these digital values may be obtained from means for determining the values of a specific parameter of the signal issuing from the attenuating means and for comparing said value with predetermined threshold values.

Figure 2:
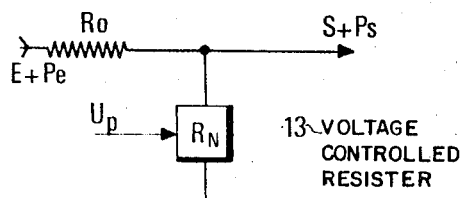
Figure 3:
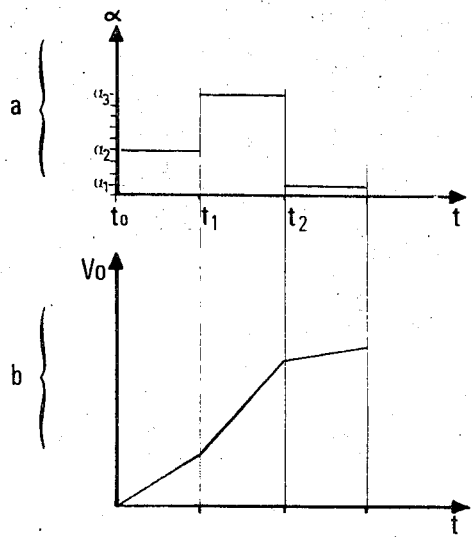

Other particular features and advantages of the device according to the invention will be made clearly apparent from the following description of a nonlimitative embodiment of such device, illustrated by the accompanying drawings wherein:

FIG. 1 diagrammatically shows the assembly of the constituting elements of the device, FIG. 2 diagrammatically shows, by way of example, an attenuator, and FIG. 3 shows signals issued from the reference voltage generator.

Figure 4:
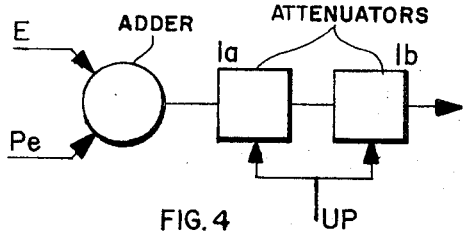

FIG. 4 diagrammatically shows a second embodiment of the present invention.

The device of FIG. 1 comprises a variable attenuator 1 whose input terminals are connected to a signal adder 2 for making the algebraic sum of signals E, issuing from the sensors, with a program-signal Pe generated by program signal generator 16. This program-signal may be either a direct voltage of constant amplitude or a alternating voltage of constant amplitude having a steady frequency different from that of signals E.

Let B represent the attenuation factor of attenuator 1, Up the control voltage of the latter, and respectively S and Ps the amplitudes of signals E and Pe after attenuation. The output terminals of attenuator 1 are connected to a filter 3, itself connected, for example, to a rectifier 4. These two elements 3 and 4 detect and isolate the component Ps of the signal issued from the attenuator 1. The signal issued from the rectifier 4 is algebraically substracted from a reference voltage $V_o$ in an element 5 connected to an operational integrator 6 of a known type, which produces a signal Up for controlling the attenuator. This attenuator, as shown in FIG. 2, is a voltage divider, constituted by a linear resistor Ro and a resistor $R_N$ (13) whose resistance varies in accordance with the voltage Up applied thereto. The output voltage of the divider is taken at the terminals of resistor $R_N$, which may consist, for example, of a photoresistant diode, a field effect transistor or a Hall effect modulator.

The voltage amplitudes of signals S, Ps, E and Pe are interrelated as follows:

$$(S/Ps) = (E/Pe)$$

(1)

irrespective of the resistance value of $R_N$ resulting from the control voltage Up. The variations of said control voltage changes the attenuation factor B of the attenuator 1 until the value of Ps becomes substantially equal to the value of the reference voltage Vo applied to element 5. The relationship (1) can thus be written:

$$(S/Vo) = (E/Pe)$$

(2)

In a number of cases, the amplitude of the received signals decreases according to a hyperbolic function (geometrical attenuation of the waves). As it is difficult in practice to generate with accuracy a program-law Pe decreasing similarly according to a hyperbolic function in order to follow the evolution of signals E, it is preferred to maintain it at a constant value with the desirable accuracy and to vary the voltage $V_o$. According to the above relationship (2) it is apparent that the signal S may be kept constant by varying the reference voltage Vo as the inverse of the hyperbolic envelope of signals E, i.e by increasing it linearly. This law of increase is easy to generate with accuracy. Moreover the attenuation factor B may be known with accuracy, even if the linear components $R_N$ vary with temperature. As a matter of fact this coefficient is expressed as follows:

$$B = (S/E) = (Vo/Pe)$$

(3)

and accordingly varies in proportion to the voltage $V_o$ when the value of Pe is kept constant.

The device further comprises a system for generating straight line portions of voltage $V_o$, proportional to time, according to the relationship:

$$Vo = \alpha t$$

(4)

The curve representing this voltage may consist of a continuous succession of straight line portions whose slopes vary at determined intervals. In accordance with the shape of this curve it is possible to substantially damp the distorsions of the output signals resulting from discontinuous jumps of the value of the attenuation factor which are present in the gain binary control systems.

This curve is generated by selecting the value of the slope from a discontinuous series of values coded in a digital form.

The device for synthetizing said curve comprises a memorizing element 9 (FIG. 1) containing a program of values coded in a binary form. This element is connected to an adding-substracting counter 10 with four bits, for example. At preselected moments, the memorizing element 9 transfers these values to the counter 10. The latter is connected to a digital to analogue converter 11 constituted, for example, by a network for digital to analogue conversion of a known type comprising a set of weighted resistances interconnected through a series of switches. The analogical signal produced by the converter 11 consists of a discontinuous succession of constant amplitude sections $\alpha_1, \alpha_2, \alpha_3$ over each successive interval defined by the switching times $t_o, t_1,$ etc . . . (FIG. 3, diagram $a$).

The amplitude values of these sections are generally arranged in an increasing or a decreasing order. They will be such for example that $\alpha_1 < \alpha_2 < \alpha_3$ or $\alpha_1 > \alpha_2 > \alpha_3$. The converter 11 is connected to an integrator 12 producing a reference voltage Vo similar to that shown in diagram $b$ of FIG. 3, which is supplied to element 5. The adding-substracting counter 10 may be connected to a system for recording the successive values transferred thereto.

The synthesis of the voltage Vo may also be achieved by selecting the successive values $\alpha_1, \alpha_2, \alpha_3 \ldots$ of the slopes as a function of the signal produced by the attenuator 1. For this purpose the output terminals of the attenuator are connected to an amplifier 7 (FIG. 1) of constant gain, through an element 14 for isolating the component S.

The output terminals of the amplifier are connected both to a utilizing system, not shown, and to an element 15 for determining the value of a specific parameter of the signal produced by the amplifier 7. By means of element 15, it is possible, for example, to determine the average energy level of the signal in the case where it is desired to keep it substantially stable. The element 15 may also be adapted for the determination either of the peak amplitude of the signal or of the average of the absolute values of the signal amplitude. These examples are however not intended to be limitative. The element 15 is connected to a threshold circuit 8 which compares the amplitude of signal S to those of calibrated signals. The amplitudes of two of these thresholds will be referred to, for example, as $\delta_1$ and $\delta_2$. Depending on the fact that the amplitude S of the signal is lower than the lowermost threshold amplitude, comprised between amplitude values of the two thresholds, or greater than the amplitude of the uppermost signal, the circuit 8 will assign to the adding-substracting counter 10 three values $\alpha_1, \alpha_2, \alpha_3$ so that the voltage Vo changes the attenuation factor B of the attenuator 1 to such an extent that the amplitude of signal S will be kept within the range defined by the two thresholds.

Advantageously use will be made of the threshold circuit described in the French patent 1,506,276 relating to the automatic binary control of an amplifier gain.

The device according to the invention is particularly adapted to the systems for amplifying signals and for compensating a weakening thereof resulting from their propagation through the medium in which they have been transmitted from a pin-point transmission source.

When the absorption by the propagation medium is low, the amplitude of the signals decreases according to a hyperbolic law. In such a case, the reference voltage, which corresponds to a linear function with a constant slope, will be generated very simply from a single value $\alpha$.

In seismic prospecting, the acoustic signals transmitted through the earth are partially absorbed and their amplitude decreases substantially as the inverse of the square of time. It would not depart from the scope of the invention to replace, in such a case, the attenuator 1 by two identical attenuators 1a and 1b connected in series and controlled by the same integrator 6, as is shown in FIG. 4, so that the amplitude of the reference voltage Vo be also represented by a linear function of constant slope.

Other embodiments of the device may also be contemplated without departing from the scope of the invention as defined in the appended claims.

What I claim is:

1. An amplifier of variable gain for amplifying input signals whose amplitude vary during time, comprising first means for generating a program-signal having a maximal amplitude which is constant and independent from amplitude variations of the input signals, means for adding the input signals to said program-signal, means for attenuating the signals resulting from said addition of signals, said means for attenuating having an attenuation factor depending on a control voltage, and means for generating said control voltage comprising means for isolating from the signal produced by said attenuating means the component corresponding to the program-signal, means for generating a voltage represented as a function of time by a curve formed of a continuous succession of straight line sections having slopes of predetermined values, means for subtracting from said voltage represented by a continuous succession of straight line sections said component isolated from the isolating means, and means for integrating the signal issued from the subtracting means, said integrated signal producing said control voltage.

2. A device according to claim 1, wherein said first means is a generator of direct voltage at a constant amplitude.

3. A device according to claim 1, wherein said first means is a generator of alternating voltage of constant amplitude.

4. A device according to claim 1, wherein said attenuating means consist of two identical attenuators connected in cascade and both connected to the output of the integrating means.

5. An amplifier of variable gain for amplifying signals whose amplitude vary during time, comprising means for generating a program-signal having a maximal amplitude which is independent from amplitude variations of the signals, means for adding the signals to the program-signal, means for attenuating the signals resulting from said addition of signals with an attenuation factor depending on a control voltage, and means for generating said control voltage comprising means for isolating from the signal produced by said attenuating means the component corresponding to said program-signal, means for memorizing binary digital signals, means for supplying to the memorizing means at predetermined moments at least one binary digital signal, means for converting said digital signals to analog signals, first means for integrating said analog signals as a function of time, means for substracting from said component the signal issued by said first integrating means, and second means for integrating the signal issued from the subtracting means which produces said control voltage.

6. A device according to claim 5 wherein said means for supplying digital values to the memorizing means comprise means for storing a series of predetermined digital values and for transfering said values to the counting means at preselected moments.

7. A device according to claim 5 wherein said means for supplying digital values to the memorizing means comprise means for isolating from the signal produced by the attenuation means a second component corresponding to the signals of variable amplitude, means for amplifying said second component, means for determining a specific parameter of the signal produced by said amplifying means and means for comparing the value of said parameter to threshold-values, said comparing means being adapted to transfer to the memorizing means predetermined binary digital values which differ according to the direction of variation of said parameter values at the moments where they become equal to said threshold values.

8. A device according to claim 7, wherein the means for determining a specific parameter of the signal comprises an element for supplying a signal corresponding to the average energy level of the signal produced by the amplifying means.

9. A device according to claim 7 wherein the means for determining a specific parameter of the signal comprises an element for supplying a signal corresponding to the peak amplitude of the signal produced by the amplifying means.

10. A device according to claim 7, wherein the means for determining a specific parameter of the signal comprises an element for supplying a signal corresponding to the average of the absolute values, over a determined time interval, of the amplitude of the signal produced by the amplifying means.

11. A device according to claim 5, wherein said means for generating a program-signal is a generator of direct voltage with a constant amplitude.

12. A device according to claim 5, wherein said means for generating a program-signal is a generator of alternating voltage of constant amplitude.

13. A device according to claim 5, wherein said attenuating means consists of two identical attenuators connecting in cascade and both connected to the output of the second integrating means.

* * * * *